United States Patent [19]

Onagi et al.

[11] Patent Number: 5,617,406
[45] Date of Patent: Apr. 1, 1997

[54] OPTICAL DISC WITH HEAT BLOCKING BANDS BETWEEN TRACKS

[75] Inventors: Nobuaki Onagi; Fumihiko Yokogawa, both of Saitama-ken, Japan

[73] Assignee: Pioneer Electronic Corporation, Tokyo, Japan

[21] Appl. No.: 391,445

[22] Filed: Feb. 21, 1995

[30] Foreign Application Priority Data

Feb. 25, 1994 [JP] Japan .................................. 6-028451

[51] Int. Cl.$^6$ ...................................................... G11B 7/24
[52] U.S. Cl. .................... 369/275.3; 369/275.4; 369/275.5
[58] Field of Search .......................... 369/275.3, 275.4, 369/275.1, 275.5

[56] References Cited

U.S. PATENT DOCUMENTS 5,268,887 12/1993 Honguh et al. .................. 369/275.3 X
5,353,277 10/1994 Yasuda et al. ........................ 369/275.4

Primary Examiner—David C. Nelms
Assistant Examiner—Huan Hoang
Attorney, Agent, or Firm—Nikaido Marmelstein Murray & Oram LLP

[57] ABSTRACT

An optical disc has a plurality of tracks arranged in a radical direction of the disc. On each track, a plurality of servo areas for recording servo information and a plurality of data areas for recording data information are provided. A heat blocking band is provided between adjacent tracks in the data area for preventing heat from transmitting to the data area.

9 Claims, 10 Drawing Sheets

OPTICAL DISC WITH HEAT BLOCKING BANDS BETWEEN TRACKS

BACKGROUND OF THE INVENTION

The present invention relates to an optical disc and more particularly to an optical disc having a high recording density by using a sampled servo tracking method.

As a recording format for the optical disc, a sampled servo tracking method is known. The optical disc using the sampled servo tracking method is provided with a preformat (pits) on a recording film comprising servo areas (fields) at 1376 points on a track. By sampling the servo area, tracking error and clock for recording and reproducing are generated.

FIG. 7 shows a conventional optical disc DK dependent on a recording format of the sampled servo tracking method. The optical disc DK has a program area PA in which a spiral track is formed from the inner portion to the outer periphery of the disc to provide a plurality of tracks arranged in the radial direction of the disc. One track is divided into 32 sectors. Each sector has 43 segments. A first segment #0 of the 43 segments has a preformat comprising a synchronizing signal Ssync of 1 byte for synchronizing at each sector unit and an address $S_{ADR}$ of 1 byte for addressing the sector unit. The preformat is formed in the process of mastering of the optical disc. Each of the other segments #1 to #42 has 18 bytes comprising a servo area Fs of 2 bytes and a data area FD of 16 bytes.

FIG. 8 shows the servo area Fs of 2 bytes comprising a first servo byte #1 and a second servo byte #2. The first servo byte #1 has a preformat comprising a first wobbled tracking pit Pw1 formed at a third bit and a second wobbled tracking pit Pw2 formed at an eighth bit in a first 16-track (A). The first tracking pit Pw1 is inwardly deflected from a track center Tc in the radial direction by ¼ track pitch and the second tracking pit Pw2 is outwardly deflected from the track center Tc by ¼ track pitch. A tracking error is detected by the difference between the reflected lights at first and second tracking pits Pw1 and Pw2.

The second servo byte #2 has a clock pit CP for synchronization. Which is preformatted at a twelfth bit. Between the second tracking pit Pw2 and the clock pit CP, a mirror surface having a distance of 19-channel clock length is provided. The 19-channel clock is counted for synchronizing each segment. Furthermore, a focus error is detected in the synchronization detecting period.

At a next 16-track (B), a first tracking pit Pw1 is provided at a fourth bit. Since the position of the first tracking pit Pw1 is changed between the 3 bit and 4 bit at every 16-track, the number of tracks during search is detected with accuracy.

When the servo area Fs is irradiated with a laser beam, a detected signal including a tracking signal ST1 (ST1A and ST1B) and a synchronizing signal Ssync is generated as shown in FIG. 8.

Thus, in the sampled servo tracking method, various information signals such as the tracking error signal and focus error signal are derived from the wobbled tracking pits Pw1, Pw2, and clock pits which are formed beforehand as prepits on the optical disc. In order to obtain the information, a laser beam is radiated on pits.

FIG. 9a shows signal pits PT in section formed on the disc DK. When information recorded on the disc is read, the pits are irradiated with the laser beam. The intensity of the reflected light is low at the pit PT. On the disc, a mirror surface is formed between the pits, so that the laser beam is entirely reflected at the mirror surface. Thus, the intensity of the light becomes high.

Consequently, it is necessary to correctly read pits in order to read servo information with accuracy. Conventionally, a track pitch Tp is determined larger than a diameter BL of a beam spot of the laser beam (about 1.6 μm).

As shown in FIG. 9a, the width of the land is L, the width of the pit is 3L, the diameter BL of the beam spot is 3L, and the track pitch Tp=4L.

In order to increase the recording density of the disc, it is considered to reduce the track pitch Tp by one half, about 0.8 μm, as shown in FIGS. 9b and 9c. In FIG. 9c, the axis of the laser beam is on the track center, it is called an on-track state. In FIG. 9b, the axis of the laser beam is deflected from the track center, it is called an off-track state. In those states, the difference between the intensity of the reflected light in the on-track state and the intensity of the reflected light in the off-track state is small so that the tracking servo is not accurately operated. Therefore it is difficult to reduce the track pitch.

In order to solve the problem, the applicant of the present invention proposed a tracking pit recording method for a CAV optical disc disclosed in Japanese Patent Application No. 3-64978. FIG. 10 shows a recording format of the CAV optical disc. The disc has tracks $2k$, $2k+1$, $2k+2$, $2k+3$ and $2k+4$. On the track $2k$, tracking pits Pw($2k-1$) and Pw($2k$) are provided opposite to each other with respect to a track center and are separated by a pitch L. A synchronizing pit PSYNC and a discriminating pit $P_{DET}$ are formed on the track center. The tracking pit Pw($2k-1$) corresponds to the first tracking pit Pw1 and the tracking pit Pw($2k$) corresponds to the second tracking pit Pw2.

On the track $2k+1$, a tracking pit Pw($2k+1$) is provided opposite to the tracking pit Pw($2k$) of the track $2k$ about a track center of the track $2k+1$. Only the synchronizing pit $P_{SYNC}$ is formed on the track center. The tracking pit Pw($2k+1$) corresponds to the first tracking pit Pw1 and the tracking pit Pw($2k$) corresponds to the second tracking pit Pw2.

It is noted that the tracking pit Pw($2k$) is commonly used in between the tracks $2k$ and $2k+1$. Namely, the first and second tracks are formed in one track pitch Tp. Thus, the track pitch Tp is reduced to the half, 2L, and the number of tracks is increased twice to increase the recording density twice.

In order to reproduce such a disc without causing crosstalk, there has been proposed a super resolution reproducing system using a magnetically induced super resolution (MSR).

In the field of optics, it is known that the resolution of a microscope can be improved by providing an optical mask such as a pinhole on an object to be observed. The MSR improves the resolution not by providing a physical mask on surface of the magneto-optical disc, but by forming a mask, in effect, using a difference of temperatures of the medium, hence substantially increasing the spatial frequency. As a result, 1.5 to 3 times as much recording density can be obtained. For details, refer to the journal of Nippon Ouyou Jiki Gakkai, Vol. 15, Nov. 5, 1991.

Hence it is necessary to accurately control the distribution of temperature on the disc. Without such a control, the crosstalk between two adjacent recorded tracks may occur. The crosstalk renders it impossible to read information from the disc.

SUMMARY OF THE INVENTION

An object of the present invention is to provide an MSR optical disc where the distribution of temperature on the disc can be easily controlled so that information recorded on the disc can be accurately reproduced.

According to the present invention, there is provided an optical disc having a plurality of tracks arranged in a radical direction of the disc, each of the tracks having a plurality of servo areas for recording servo information, and a plurality of data areas for recording data information.

In the data area, a heat blocking band is provided between adjacent tracks at least in the data area for preventing heat from transmitting to the data area.

The other objects and features of this invention will become understood from the following description with reference to the accompanying drawings.

DETAILED DESCRIPTION OF THE PREFERRED EMBODIMENTS

Figure 1:
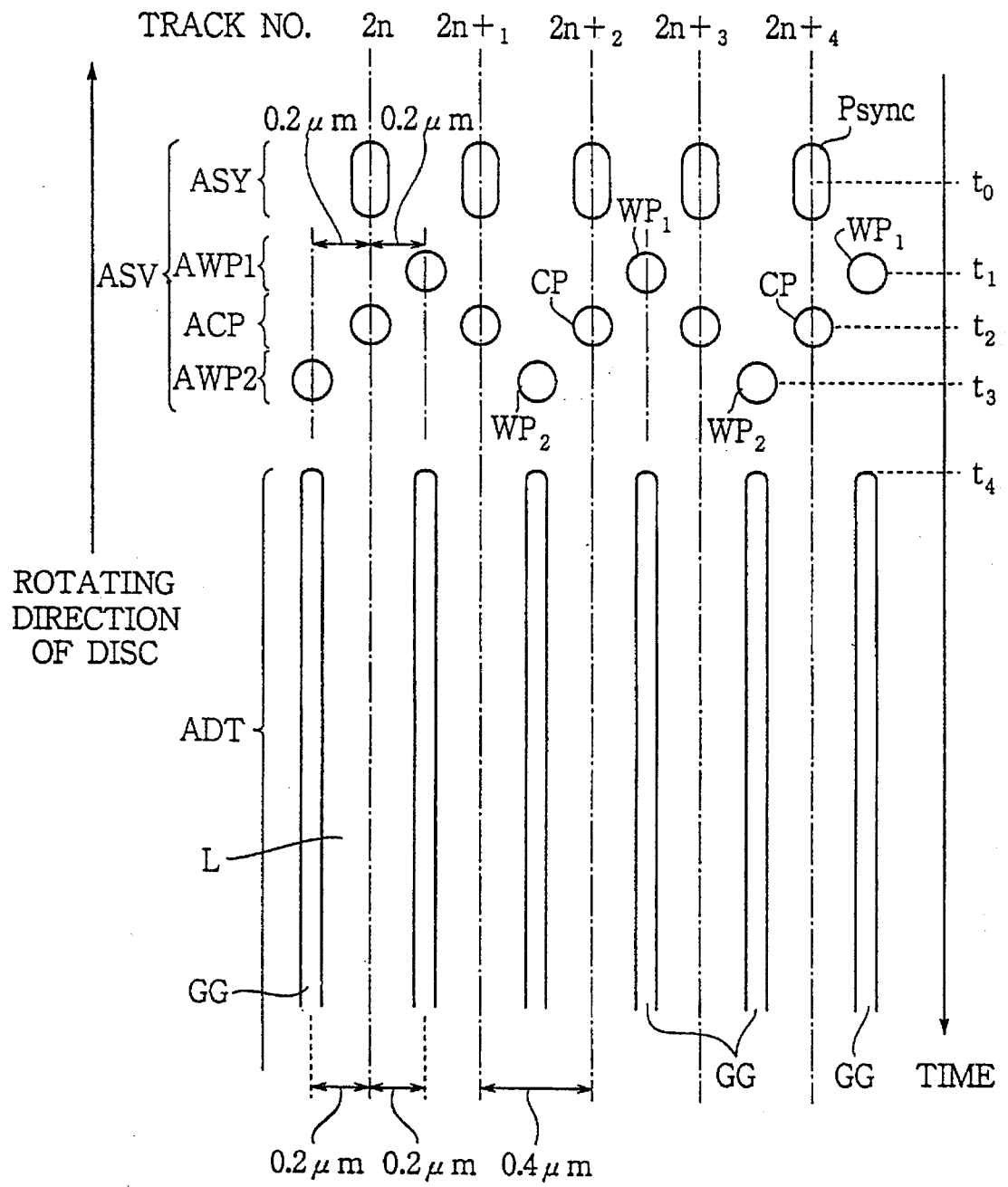
FIG. 1 is a schematic diagram showing a recording format for an optical disc according to the present invention.

Referring to FIG. 1 showing a recording format for an optical disc according to the present invention, a plurality of recording tracks having track numbers 2n to 2n+4 (n is natural number) are disposed on the disc n the radial direction. Each recording track has a plurality of segments. In the figure, only one of the segment is illustrated for the ease of explanation. Each segment is provided corresponding to a group of data. The group of data includes a synchronizing pit area ASY, a first tracking pit area AWP1, a clock pit area ACP, a second tracking pit area AWP2, and a data area ADT for recording data. Areas ASY, AWP1, ACP, and AWP2 compose a servo area ASV.

In the synchronizing pit area ASY, synchronizing pits Psync are disposed on the track center, for determining a sampling timing as a standard timing at recording.

In the first tracking pit area AWP1, the first tracking pit WP1 of each of the even tracks 2n, 2n+2, 2n+4 is disposed on the right side of a track center at positions corresponding to a sampling timing $t_1$. In the segment of odd tracks 2n+1, 2n+3, first wobbled tracking pits WP1 are provided on the left side of a track center of the odd track at positions corresponding to the sampling timing $t_1$. Namely, each of the first tracking pits WP1 is used in tracking two adjacent tracks. Hence, it is possible to increase the recording density of the disc.

In the clock pit area ACP, clock pits CP are provided in a line in the radial direction of the disc on the track centers of even and odd tracks corresponding to a sampling timing $t_2$ indicating a clock generating timing.

In the second tracking pit area AWP2, second wobbled tracking pits WP2 are provided on the left side of the track center in the segment of the even tracks 2n, 2n+2, 2n+4 corresponding to a sampling timing $t_3$. In the segment of odd tracks 2n+1, 2n+3, second tracking pits WP2 are provided on the right side of the track center of the odd track corresponding to a sampling timing $t_3$. Like the first tracking pit WP1, the second tracking pit WP2 one track is also used for another track, thereby enabling an increase in the recording density.

From a sampling timing $t_4$ onward, the data area ADT is formed. In the data area ADT, a pair of guard band grooves GG, as heat blocking bands for blocking heat, are provided at opposite sides of each track, inparallel along each land L where information is recorded. Each guard band groove GG is spaced from the center line of the track by the same wobbled distance as are the tracking pits WP1 and WP2. In the embodiment of FIG. 1, the spacing is 0.2 μm.

Describing the guard band groove in detail, the optical disc to which the present invention is applied uses a sampled servo tracking method to obtain the track error signal. Hence the guard band groove GG is quite different from a pre-groove provided in an ordinary disc and need not be designed to generate a track error signal. Thus, the guard band groove GG may have any depth and shape as long as the guard band groove GG protects the tracks from heat at reproduction.

Figure 2:
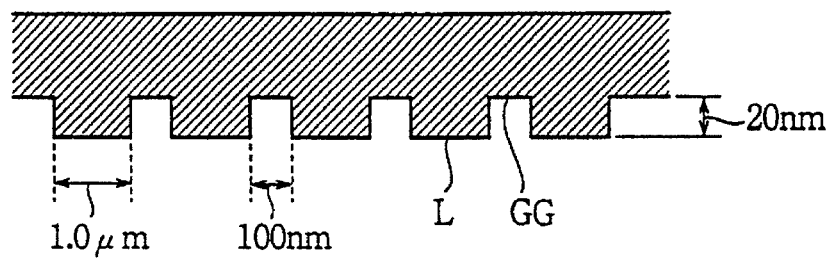
FIGS. 2a to 2d are sectional views of the optical discs of the present invention.
Figure 2:
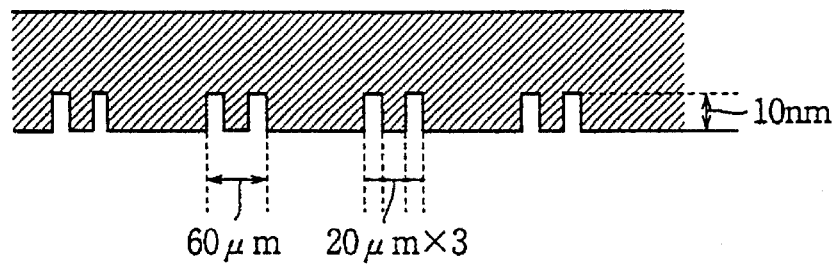
Figure 2:
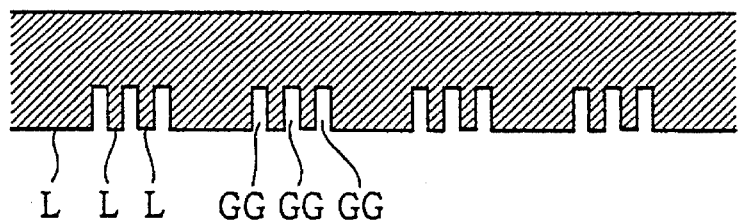
Figure 2:
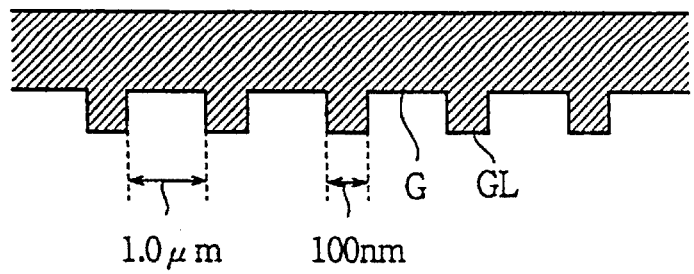

Referring to FIG. 2a, in an example of a disc where the track pitch is 1.0 μm and the wavelength of the beam for reading information is 680 nm, a guard band groove GG having a depth of 20 nm and a width of 100 nm is sufficient for blocking heat.

Referring to FIG. 2b, when the tracks disposed at a track pitch of 0.8 μm are read with the beam the wavelength of which is 680 nm, two grooves GG, each having a depth of 10 nm and a width of 20 nm, are disposed 20 nm apart from each other. The number of the guard band grooves GG between the tracks may be three as shown in FIG. 2c, or more.

Figure 3:
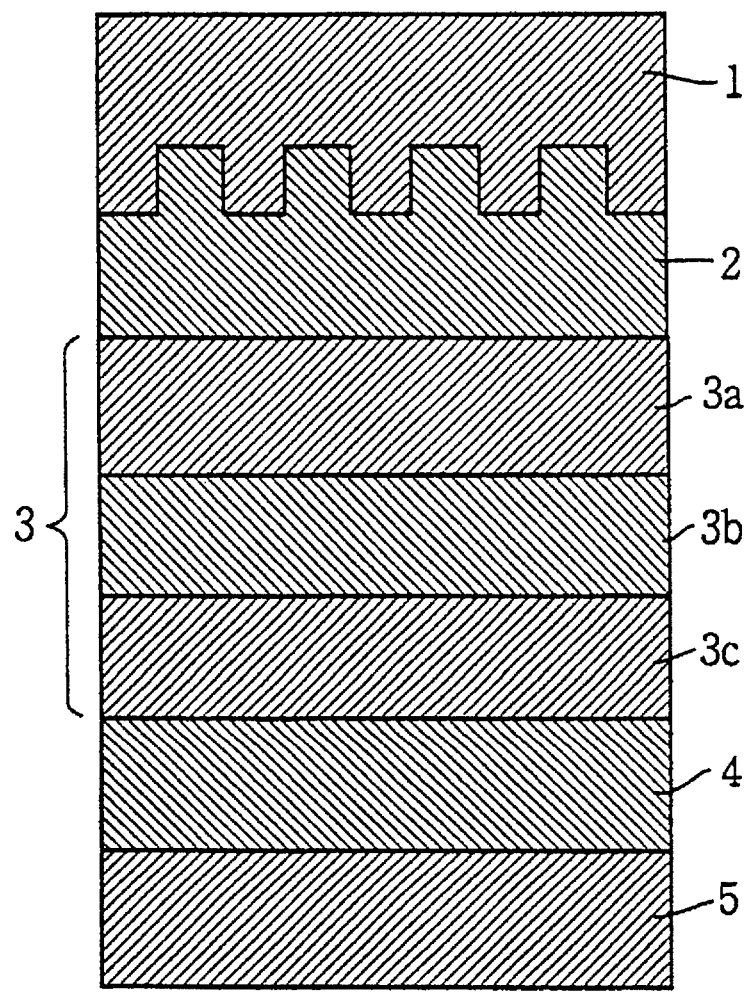
FIG. 3 is a sectional view of an optical disc.

Referring to FIG. 3, the optical disc of the present invention has a layered construction having a substrate 1, first dielectric layer 2, magneto-optical recording layer 3, second dielectric layer 4 and a coating layer 5, comprising a two-part ultraviolet-setting acrylic resin for protecting the first and second dielectric layers 2 and 4 and the magneto-optical layers 3. The first dielectric layer 2 is, for example, a zinc sulfide (ZnS) film having a thickness of 80 nm.

The magneto-optical recording layer 3 is a front aperture detection (FAD) medium. The FAD medium is so adapted to create a high temperature region at the rear end portion of a beam spot which serves as a masking region. The front end portion of the beam spot forms a low temperature region serving as an aperture for reading out information from the track. For example, the magneto-optical recording layer 3 comprises a first layer 3a adjacent the first dielectric layer 2 made of gadolinium-iron-cobalt compound ($G_{a23}(Fe_{90}Co_{10})77$ [atomic percent]) having a thickness of 30 nm. A second layer 3b of a terbium-iron compound ($Tb_{20}Fe_{80}$[atomic percent]) having a thickness of 10 nm is formed on the first layer 3a, and a third layer 3c of terbium-iron-copper compound ($Tb_{22}(Fe_{90}CO_{10})78$[atomic percent]) having a thickness of 40 nm is formed between the second layer 3b and the second dielectric layer 4. The second dielectric layer 4 is for example a 50 nm thick zinc sulfide (ZnS) film.

Figure 5:
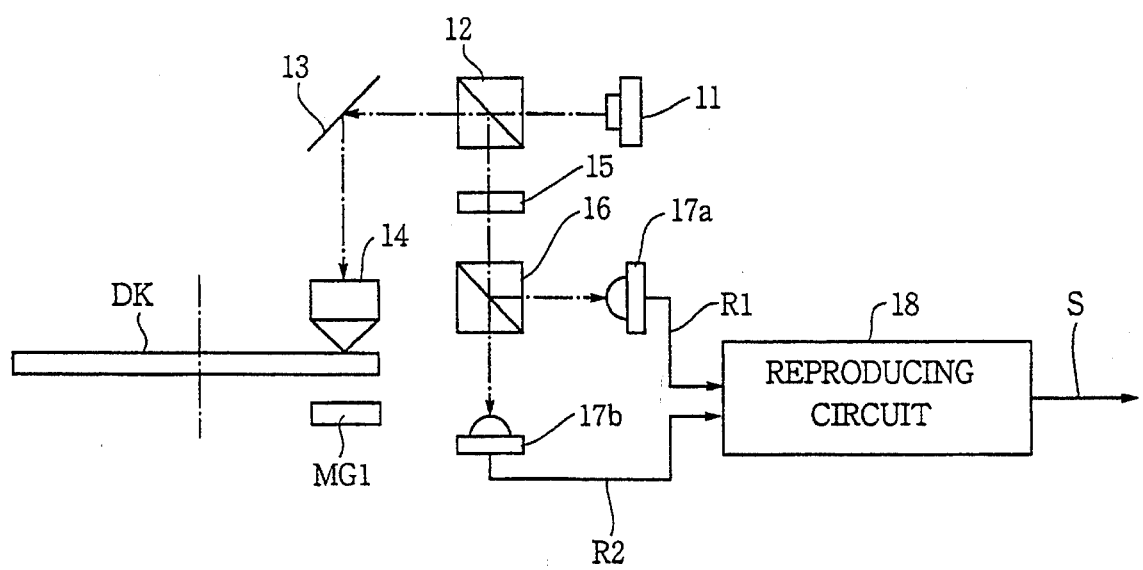
FIG. 5 is a schematic diagram showing a reproducing system of the optical disc according to the present invention.

Referring to FIG. 5, a reproducing system 10 for reading data from the disc of the present invention has a laser diode 11 which emits a reading light beam. The light beam is transmitted through a beam splitter 12 and a mirror 13, and is focused on a disc DK by an objective 14. The reproducing light reflected from the disc DK is received by a first light receiving element (photo detector) 17a and a second light receiving element 17b through the beam splitter 12, a halfwave plate 15 and a polarized beam splitter 16. The polarized beam splitter 16 transmits only the light polarized at a predetermined angle, that is the light reflected at the low temperature region of the FAD medium, and reflects all other lights reflected at the spot including the low temperature region. The halfwave plate 15 adjust the quantities of the light reflected and transmitted by the beam splitter 16.

The first light receiving element 17a and the second light receiving element 17b produce a first read out RF signal R1 and a second read out RF signal R2, respectively, in accordance with the quantity of received light. The read out signals R1 and R2 are fed to a reproducing circuit 18 comprising such elements as a decoder and an amplifier for generating a reproduced signal S. A magnet MG1 is provided under the disc DK for orienting the magnetization in the disc in one direction.

The operation of the reproducing system 10 is described hereinafter. A reading light emitted from the laser diode 11 is focused on a tack on the disc DK through the beam splitter 12, mirror 13, and the objective 14, thereby forming a beam spot thereon to heat the recording film.

As the disc DK is rotated, the beam spot moves along the track. Since the temperature of the recording film gradually rises, there is formed a high temperature region in a rear end portion of the recorded mark where the recording layer 3 is heated, thereby causing the recorded mark to erase temporarily. Accordingly, the polarization of the light reflected from the high temperature region at which recorded marks are erased is temporarily in a constant polarized state and applied to the light receiving element. On the other hand, in the low temperature region where the recorded mark does not disappear, the reflected light is polarized at an angle $\theta k$ due to the Kerr effect of the magneto-optical recording layer 3.

The reading beam is further radiated on the adjacent tracks. However, the guard band groove GG is formed between the tracks and the temperature of the adjacent track is thereby prevented from rising. Thus, the recorded marks of the adjacent track are heated to a small enough extent so that the marks do not disappear. As a result, the light reflected on the adjacent track is applied to the light receiving elements 17a and 17b without disappearing. However, since the data density in the reflected light is larger than the resolution power of the system, the data are not read out. Thus, the recorded areas of the adjacent tracks are also blocked as well as the high temperature region, thereby preventing crosstalk. Hence the reading accuracy is further improved.

The quantities of the light reflected from the high temperature region and adjacent tracks are adjusted by the halfwave plate 15, so that the light receiving elements 17a and 17b may receive the same quantity of light therefrom. The reproducing circuit 18 calculates a difference between the first read out signal R1 and the second read out signal R2, whereby the components of the signal generated from the high temperature region and adjacent tracks are canceled. Hence both regions are virtually blocked out. As a result, the reproduced signal S from the reproducing circuit 18 includes only the data read out from the low temperature region.

Thus, data recorded at a high spatial frequency fc (fc= $2NA/\lambda$ where NA is the aperture number NA of the objective 14 and $\lambda$ is the wavelength of the reproducing beam) can be read out.

Figure 4:
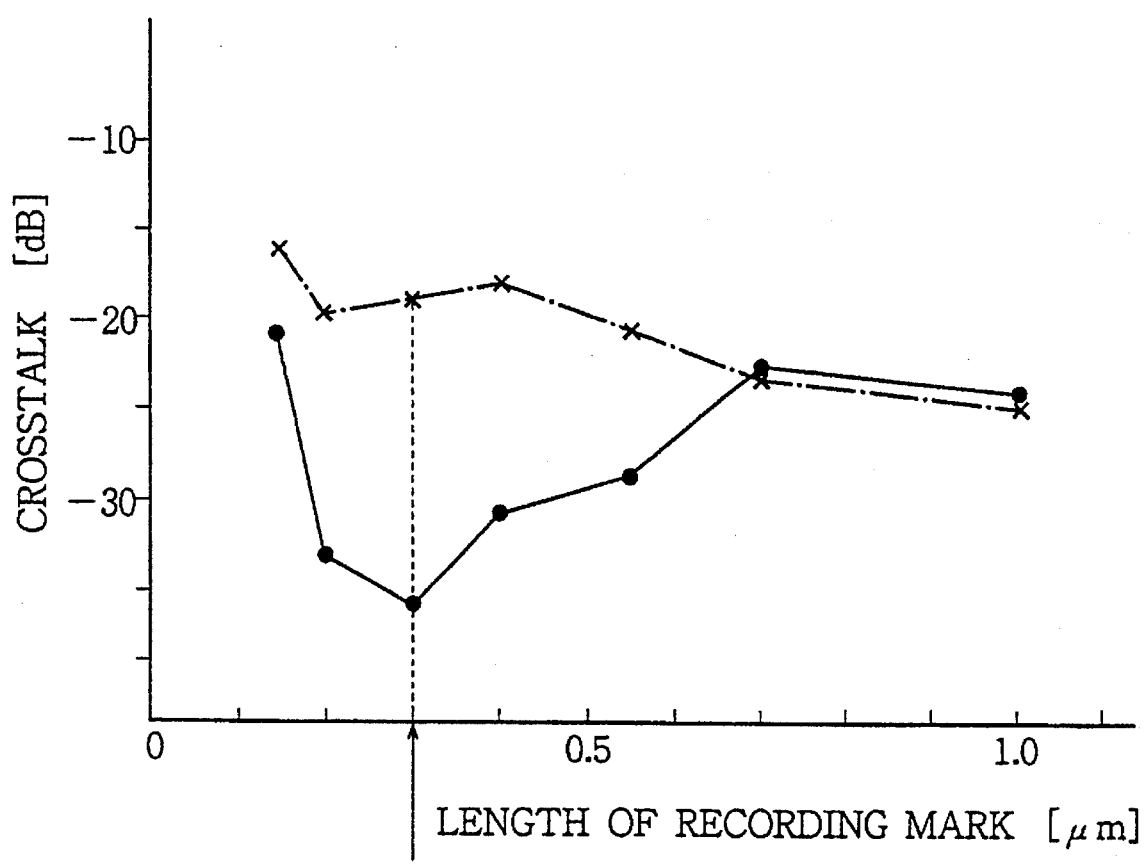
FIG. 4 is a graph showing relationships between quantities of crosstalk and lengths of recording marks formed on the discs of the prior art and of the present invention.

FIG. 4 is a graph showing the relationship between the quantity of the crosstalk and the length of a recording mark of a track in the FAD medium disc when a wavelength of the reading light beam is 680 nm and the aperture number of the optical system is 0.55. In the graph, dotted line and solid line indicate the characteristics of the conventional disc without the guard band groove and the disc of the present invention having the groove GG, respectively. As shown in the graph, when the length of the recording mark is in the region of 0.3 μm, which is an optical outoff, the difference of the crosstalk quantities in the conventional disc is as much as eight times that of the disc of the present invention. Thus, it is apparent that the guard band groove GG restrains the crosstalk.

Figure 6:
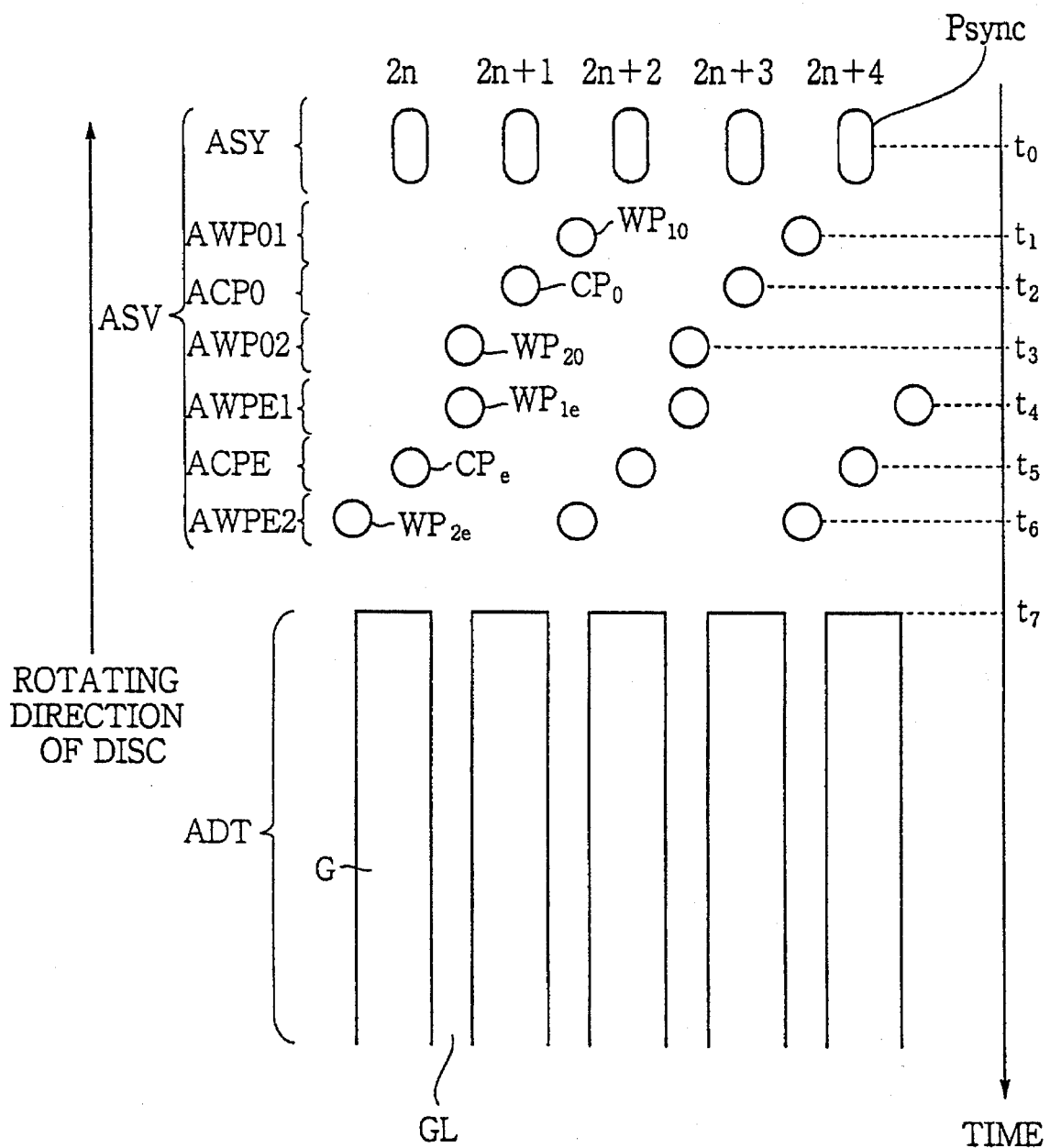
FIG. 6 is a schematic diagram showing another example of the recording format of the optical disc of the present invention.
Figure 7:
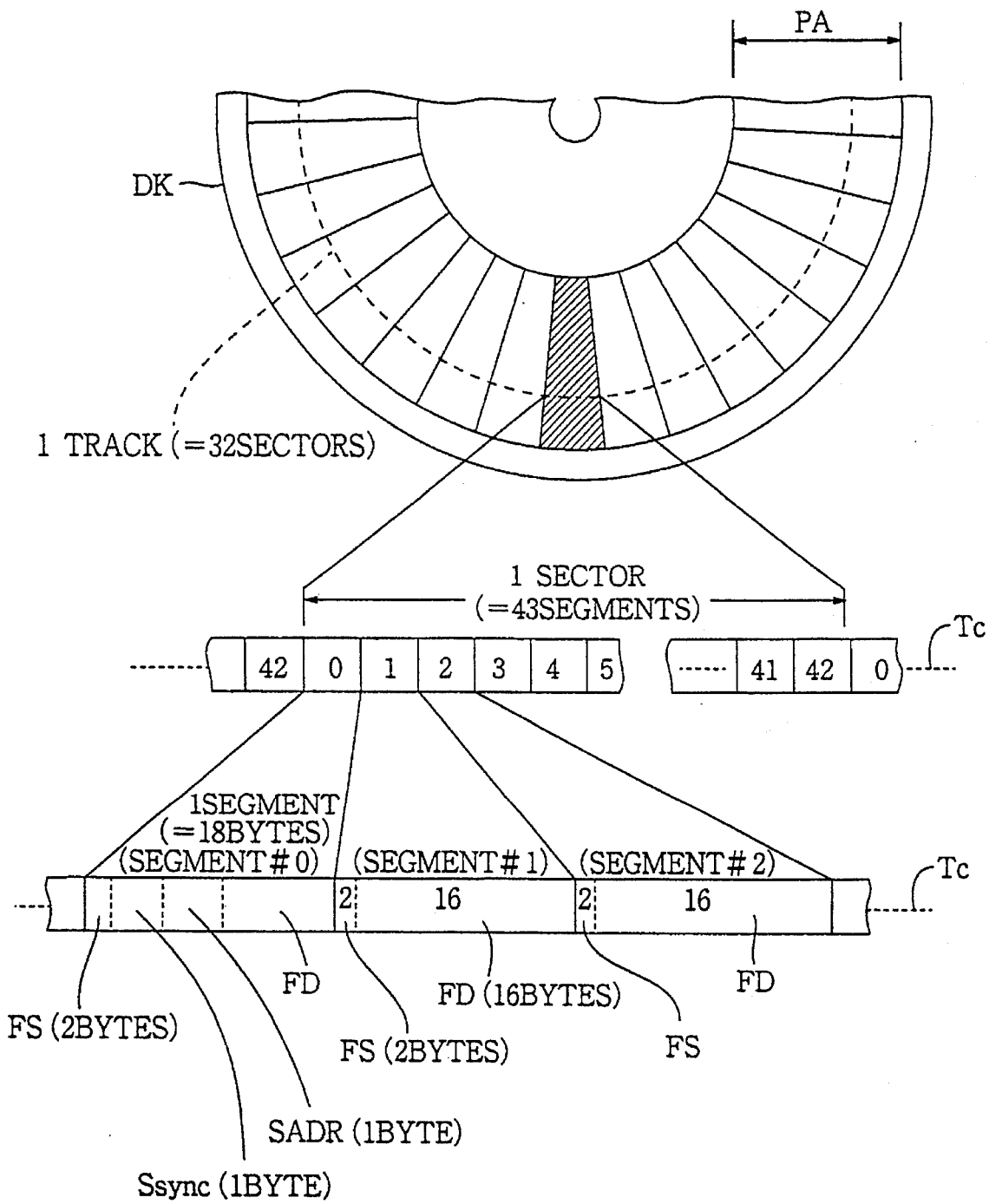
FIG. 7 is a schematic diagram showing a recording format for an optical disc using a conventional sampled servo tracking method.
Figure 8:
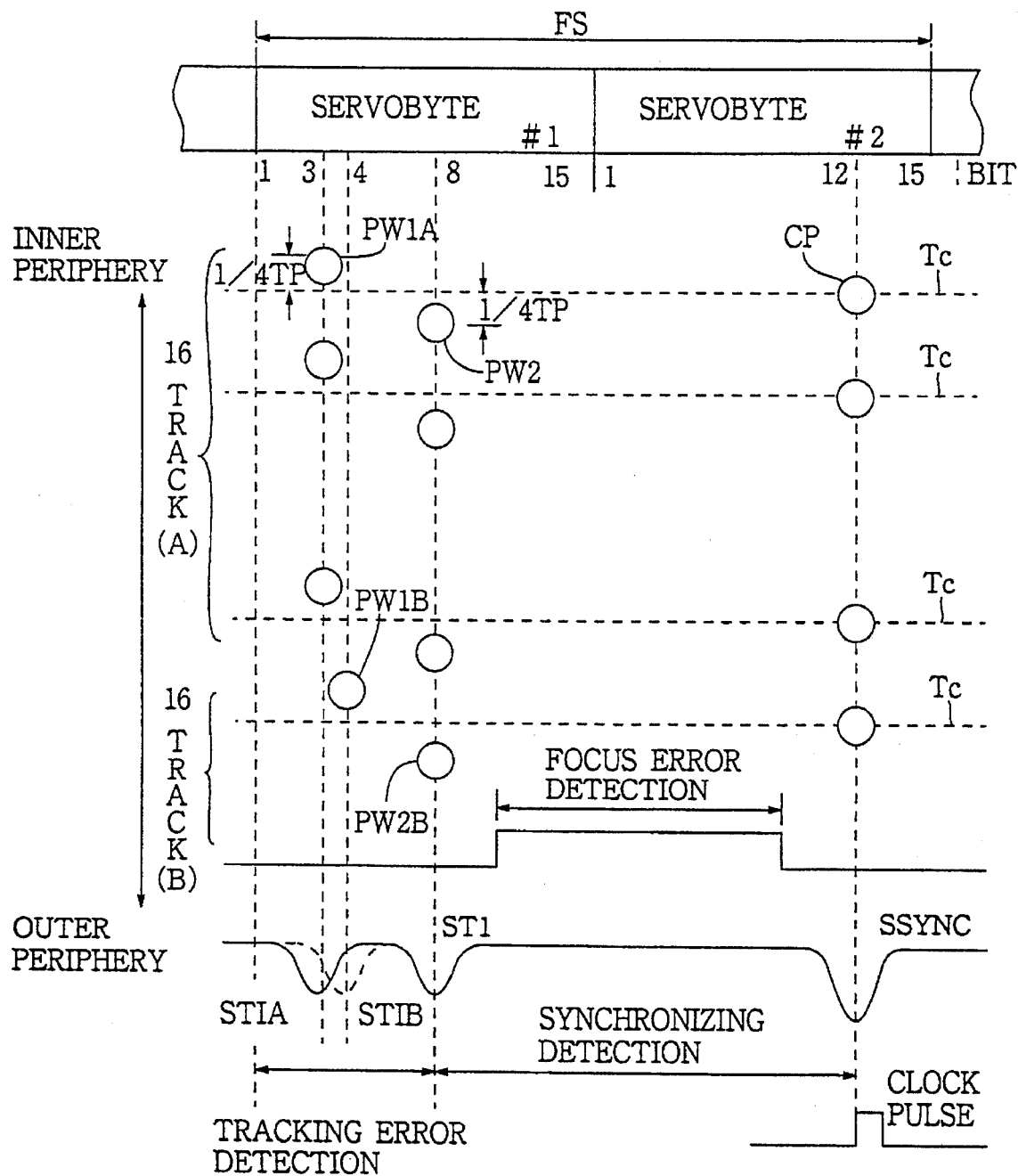
FIG. 8 is a diagram showing a servo byte of the conventional recording format.
Figure 9:
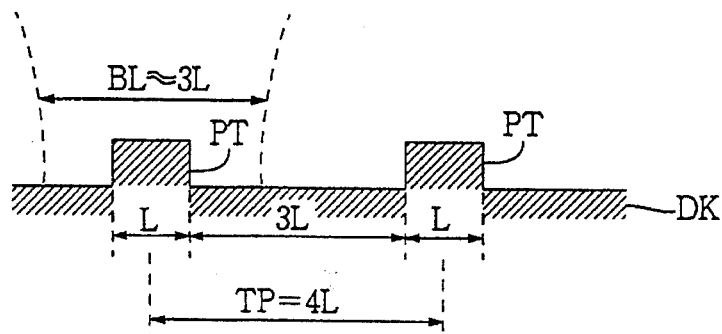
FIGS. 9a, 9b and 9c are schematic sectional views showing track pits formed on the conventional disc.
Figure 9:
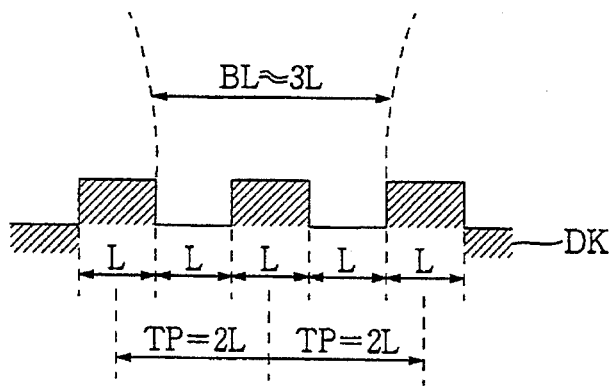
Figure 9:
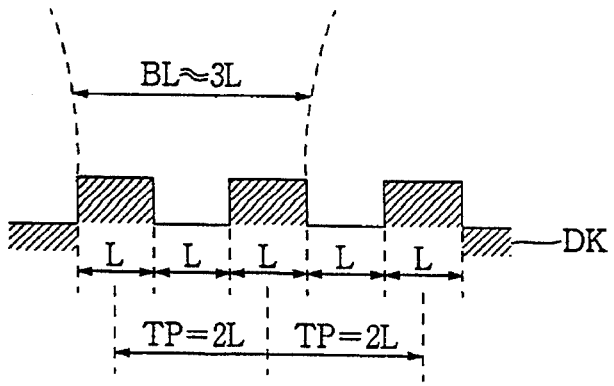
Figure 10:
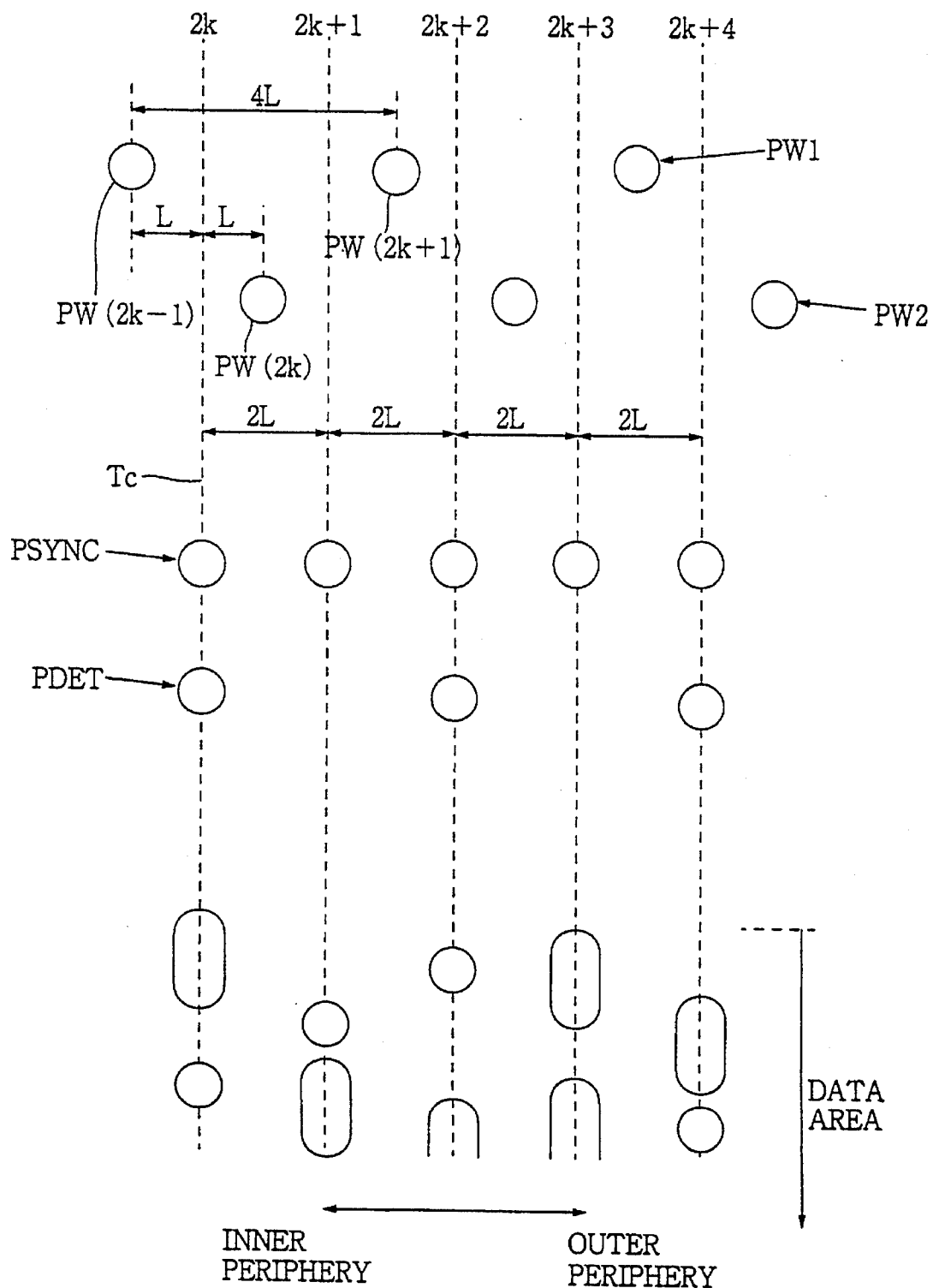
FIG. 10 is a diagram showing a recording format for another conventional method.

Referring to FIG. 6, the present invention may be applied to an optical disc where the data are recorded not on the land but in a groove G, in which case a guard band land GL is formed between the grooves G to block heat.

The servo area ASV of the disc comprises the synchronizing pit area ASY, a first odd tracking pit area AWPO1, an odd clock pit area ACPO, a second odd tracking pit area AWPO2, a first even tracking pit are a AWPE1 an even clock pit area ACPE, and a second even tracking pit area AWPE2.

The synchronizing pits Psync are disposed on the center of each track in the synchronizing pit area ASY to determine the sampling timing $t_0$.

In the first odd tracking pit area AWPO1, first tracking pit $WP_{10}$ of each of the odd tacks 2n+1, 2n+3, is provided on the right side of a track center of the odd track at positions corresponding to a sampling timing $t_1$.

In the odd clock pit area ACPO, clock pits $CP_0$ are provided in a line in the radial direction of the disc on the track centers of even and odd tracks corresponding to a sampling timing $t_2$ indicating a clock generating timing.

In the second tracking pit area AWPO2, second tracking pits $WP_{20}$ are provided on the left side of the track center in the segment of the odd tracks 2n+1, 2n+3, corresponding to a sampling timing $t_3$.

In the first even tracking pit area AWPE1, the first even tracking pit WPle of each of the even tracks 2n, 2n+2, 2n+4 is disposed on the right side of a track center at positions corresponding to a sampling timing $t_4$.

In the even clock pit area ACPE, clock pits $CP_e$ are provided in a line in the radial direction of the disc on the track centers of even and odd tracks corresponding to a sampling timing $t_5$ indicating a clock generating timing.

In the second even tracking pit area AWPE2, second even tracking pits $WP_{2e}$ are provided on the right side of the track center in the segment of the even tracks 2n, 2n+2, 2n+4 corresponding to a sampling timing $t_6$.

The data area ADT wherein various data are recorded starts from a timing $t_7$. The guard band lands GL are provided in parallel to the grooves G therebetween. The center of each land GL is offset from the center of the track, the quantity thereof corresponds to the offset of the tracking pits $WP_{1o}$, $WP_{2o}$, $WP_{1e}$, and $WP_{2e}$.

As shown in FIG. 2d, for a disc with a recording groove G having a width of 1.0 μm which is read by a laser beam having a wavelength of 680 nm, it is sufficient to provide guard band lands GL having a height of 20 nm and a width of 100 nm.

The effects of the guard band land GL is the same as those of the guard band groove GG of the first example.

From the foregoing it will be understood that the present invention provides an optical disc having heat blocking bands which restrain the propagation of heat applied to one of the tracks to adjacent tracks. Thus, in the MSR disc where a difference of temperature in the recorded area enables information recorded thereon to be read with high resolution, the recorded area of the adjacent tracks can be prevented from being read out by not being heated, hence preventing crosstalk. Consequently, the information can be accurately reproduced without complicating the temperature controlling operation by the reproducing system.

Information is recorded on the data area ADT within a range corresponding substantially to distance between the wobbled tracking pits with respect to each center line of the track. Thus, upon reproduction, the areas outside this range are protected from heat by the heat blocking bands, thereby infallibly preventing crosstalk.

Moreover, since the heat blocking bands are in alignment with the tracking pits, they can be easily formed when producing a master disc.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An optical disc having a plurality of tracks arranged in a radical direction of the disc, each of the tracks comprising a plurality of servo areas for recording servo information, and a plurality of data areas for recording data information, the disc comprising in succession:

a substrate;

a first dielectric layer;

a magneto-optical recording layer;

a second dielectric layer; and a coating layer;

wherein a heat blocking band is disposed between adjacent tracks at least in the data area for preventing heat from transmitting to the data area.

2. The optical disc according to claim 1 wherein the heat blocking band is a groove in the surface of said disc.

3. The optical disc according to claim 1 wherein the heat blocking band is a land projected from a surface of the disc.

4. The optical disc according to claim 1 wherein the heat blocking band does not generate a track error signal.

5. An optical disc as claimed in claim 1 wherein said magneto-optical layer is a front aperture detection medium, and wherein when a beam spot is impinged on said magneto-optical layer, an increase in temperature is caused at the rear end portion of the beam which acts as a masking layer, and a lower temperature is cause at the front end portion of the beam creating an aperture area adapted for reading out information on said track.

6. An optical disc comprising:

a plurality of tracks arranged in a radical direction of the disc, wherein each of the tracks comprises a plurality of servo areas each having wobbled pits for controlling servo operation, wherein each of the wobbled pits is deflected from a center line of a track, a plurality of data areas for recording data; and a heat blocking band dispose between adjacent tracks at least in the data area for preventing heat from transmitting to the data area, wherein the heat blocking band is deflected from a center line of the track by a wobbled distance of the wobbled pit: and wherein each of said wobbled pits is arranged so as to be commonly used for adjacent tracks.

7. The optical disc according to claim 6 wherein said disc comprises a substrate, a first dielectric layer, a magneto-optical recording layer, a second dielectric layer and a coating layer.

8. An optical disc as claimed in claim 2 wherein said magneto-optical layer is a front aperture detection medium, and wherein when a beam spot is impinged on said magneto-optical layer, an increase in temperature is caused at the rear end portion of the beam which acts as a masking layer, and a lower temperature is cause at the front end portion of the beam creating an aperture area adapted for reading out information on said track.

9. The optical disc according to claim 7 wherein said heat blocking band does not generate a track error signal.

\* \* \* \* \*